(12) United States Patent
Okuyama

(10) Patent No.: US 7,443,875 B2
(45) Date of Patent: Oct. 28, 2008

(54) INFORMATION COMMUNICATION SYSTEM, DEVICE AND METHOD

(75) Inventor: Takashi Okuyama, Hamamatsu (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 698 days.

(21) Appl. No.: 10/975,327

(22) Filed: Oct. 28, 2004

(65) Prior Publication Data
US 2005/0286539 A1 Dec. 29, 2005

(30) Foreign Application Priority Data
Jun. 28, 2004 (JP) .............................. 2004-189638

(51) Int. Cl.
*H04L 12/26* (2006.01)
*H04L 12/28* (2006.01)

(52) U.S. Cl. ...................................... 370/445; 370/461

(58) Field of Classification Search ......... 370/445–448, 370/458, 400, 461
See application file for complete search history.

(56) References Cited

U.S. PATENT DOCUMENTS

| | | | |
|---|---|---|---|
| 4,497,057 A | 1/1985 | Kato et al. | |
| 4,708,669 A | 11/1987 | Kanno et al. | |
| 4,796,206 A | 1/1989 | Boscove et al. | |
| 4,805,169 A * | 2/1989 | Van Asselt | 370/445 |
| 4,822,307 A | 4/1989 | Kanno | |
| 4,938,721 A | 7/1990 | Koike | |
| 5,136,279 A | 8/1992 | Kanno | |
| 5,245,324 A | 9/1993 | Jonker et al. | |
| 5,325,082 A | 6/1994 | Rodriguez | |
| 5,352,138 A | 10/1994 | Kanno | |
| 5,450,404 A * | 9/1995 | Koopman et al. | 370/447 |
| 5,471,474 A * | 11/1995 | Grobicki et al. | 370/437 |

(Continued)

FOREIGN PATENT DOCUMENTS

JP 08-130774 5/1996

(Continued)

OTHER PUBLICATIONS

NMEA 2000; Standard for Serial Data Networking of Marine Electronic Devices; Main Document; Version 1.000, Sep. 12, 2001; @NMEA 1999, 2000, 2001.

(Continued)

*Primary Examiner*—Min Jung
(74) *Attorney, Agent, or Firm*—Knobbe, Martens, Olson & Bear, LLP

(57) ABSTRACT

An information communication device for communicating information among a plurality of components includes a plurality of nodes, each being of a particular node type that corresponds to a particular transmission slot of a plurality of transmission slots. Each transmission slot is formed from a communication cycle that has a prescribed time period. The plurality of transmission slots are synchronized with one another. The communication cycle includes a static transmission area and a dynamic transmission area, where the static transmission area includes the plurality of transmission slots that correspond to the node types. The dynamic transmission area is adapted to transmit information. Each of the plurality of nodes includes a conflict detector that determines when a transmission conflict occurs as a result of nodes of the same node type beginning transmission using the same transmission slot. Each of the plurality of nodes also includes a transmission area setter for changing the transmission slots in the static transmission area based upon information transmitted in the dynamic transmission area.

17 Claims, 12 Drawing Sheets

U.S. PATENT DOCUMENTS

| | | | |
|---|---|---|---|
| 5,481,261 A | | 1/1996 | Kanno |
| 5,499,247 A | * | 3/1996 | Matsuda et al. ............ 370/445 |
| 5,555,857 A | | 9/1996 | Kanno |
| 5,626,120 A | | 5/1997 | Akatsuka |
| 5,633,573 A | | 5/1997 | Van Phuoc et al. |
| 5,642,284 A | | 6/1997 | Parupalli et al. |
| 5,687,694 A | | 11/1997 | Kanno |
| 5,852,789 A | | 12/1998 | Trsar et al. |
| 5,886,726 A | | 3/1999 | Pawelka et al. |
| 5,904,604 A | | 5/1999 | Suzuki et al. |
| 5,930,553 A | | 7/1999 | Hirst et al. |
| 5,935,187 A | | 8/1999 | Trsar et al. |
| 6,015,317 A | | 1/2000 | Hoshiba et al. |
| 6,055,468 A | | 4/2000 | Kaman et al. |
| 6,125,312 A | | 9/2000 | Nguyen et al. |
| 6,141,608 A | | 10/2000 | Rother |
| 6,170,742 B1 | | 1/2001 | Yacoob |
| 6,213,820 B1 | | 4/2001 | Kanno |
| 6,366,199 B1 | | 4/2002 | Osborn et al. |
| 6,791,996 B1 | * | 9/2004 | Watanabe et al. ........... 370/447 |
| 6,829,584 B2 | | 12/2004 | Loveland |
| 6,890,223 B2 | | 5/2005 | Kanno |
| 6,963,747 B1 | * | 11/2005 | Elliott ....................... 455/450 |
| 7,269,178 B2 | * | 9/2007 | Fuhrmann et al. .......... 370/407 |
| 2001/0049579 A1 | | 12/2001 | Fujino et al. |
| 2002/0016655 A1 | | 2/2002 | Joao |
| 2003/0060946 A1 | | 3/2003 | Okuyama et al. |
| 2003/0060952 A1 | | 3/2003 | Kanno et al. |

OTHER PUBLICATIONS

NMEA 2000; Standard for Serial Data Networking of Marine Electronic Devices; Appendix A; Version 1.000; Sep. 12, 2001; @NMEA 1999, 2000, 2001.

NMEA 2000; Standard for Serial Data Networking of Marine Electronic Devices; Appendix B; @NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Data Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783-5 Network Management.

NMEA 2000; Standard for Serial Data Networking of Marine Electronic Devices; Appendix F; ISO 11783-3 DataLink Layer.

NMEA 2000; Standard for Serial Data Networking of Marine Electronic Devices; Appendix G; ISO 11898 Controller Area Network.

International Standard, ISO 11783-5, First edition May 1, 2001, Tractors and machinery for agriculture and forestry—Serial control and communications data network, Part 5: Network management.

* cited by examiner

INFORMATION COMMUNICATION SYSTEM, DEVICE AND METHOD

PRIORITY INFORMATION

This application is based on and claims priority to Japanese Patent Application No. 2004-189638, filed Jun. 28, 2004, the entire contents of which are hereby expressly incorporated by reference.

BACKGROUND OF THE INVENTION

1. Field of the Invention

Embodiments of this invention relate to an information communication system, device and method.

2. Description of the Related Art

A data transmission system is disclosed in Japanese patent document JP-A-Hei 8-130774 (the "Japanese reference"). The data transmission system has a plurality of terminal stations, which have only a function of radio transmission to a base station. Each of the terminal stations has a transmission timing generating part for generating a transmission timing signal based on reference timing and for supplying it to a transmission control part. The transmission control part sends data inputted from sensors and other data input devices that are stored in a data memory to a modulation part according to the timing signal from the transmission timing generating part. The modulation part modulates the data into a signal and supplies it to a transmission part. The transmission part converts the modulated signal into a radio signal and transmits it from an antenna.

In the device disclosed in the Japanese reference, transmission timing has to be separately set for each of the terminal stations. In the case of a small boat having a plurality of outboard motors, for example, a node for controlling engines in the outboard motors, a node for a remote control lever provided in the cockpit for controlling the engines in the outboard motors, and a node for a display unit for displaying the engine rotational speed and so on are connected by a network so that information can be transmitted and received between them. When the outboard motors are attached to the hull in a factory, even if there are nodes of the same type, an operator who is conversant with network settings can discriminate between them and can set different transmission areas for each of the nodes to prevent a communication conflict between the nodes. However, when a user purchases a hull and outboard motors separately and assembles them by him/herself, it is difficult to set transmission timing in each of the plurality of nodes that constitute the network. That is, there is an unsolved problem that a user cannot set a network easily.

SUMMARY OF THE INVENTION

According to one aspect, an information communication device for communicating information among a plurality of components includes a plurality of nodes. Each node is of a particular node type that corresponds to a particular transmission slot of a plurality of transmission slots. Each transmission slot is formed from a communication cycle having a prescribed time period. The plurality of transmission slots are synchronized with one another.

The communication cycle generally also includes a static transmission area and a dynamic transmission area, where the static transmission area generally includes the plurality of transmission slots that correspond to the node types; the dynamic transmission area is generally adapted to transmit information.

Each of the plurality of nodes includes a conflict detector and a transmission area setter. In one embodiment, the conflict detector determines when a transmission conflict occurs as a result of nodes of the same node type beginning transmission using the same transmission slot. The transmission area setter generally changes the transmission slots in the static transmission area based upon information transmitted in the dynamic transmission area.

In another aspect, an information communication device for communicating information among a plurality of components includes a plurality of nodes and a hub. Each of the plurality of components is generally of a particular node type that corresponds to a particular transmission slot of a plurality of transmission slots. Each transmission slot is formed from a communication cycle that has a prescribed time period. The transmission slots are synchronized with one another. The communication cycle also includes a static transmission area and a dynamic transmission area. The static transmission area includes the plurality of transmission slots that correspond to the node types. The dynamic transmission area is adapted to transmit information.

In another aspect, the hub provides communication between at least two nodes. The hub includes a conflict detector for detecting a transmission conflict that occurs when nodes of the same node type transmit using the same transmission slot. The hub also includes a discrimination information transmitter for transmitting discrimination information from a connection port to a connection port node. The discrimination information transmitter is generally adapted to use the dynamic transmission area when the conflict detector detects the transmission conflict. Each node generally includes a transmission area setter for changing the transmission slot in the static transmission area when receiving the discrimination information.

In yet another aspect of the present invention, an information communication method for communicating information over a network includes the steps of initializing a plurality of nodes, detecting a communication conflict, providing discrimination information, and changing the transmission slot of at least one node.

In one aspect, the initializing step includes initializing a plurality of nodes by assigning a transmission slot of a plurality of transmission slots to each node. Each node is generally of a particular node type, and is adapted to communicate using the transmission slot. Furthermore, in one aspect, each transmission slot is formed from a communication cycle that has a time period, a static transmission area, and a dynamic transmission area. The static transmission area includes the plurality of transmission slots.

In another aspect, the detecting step includes detecting a communication conflict between nodes of the same node type, and the providing step includes providing discrimination information in the dynamic transmission area. The changing step generally includes changing the transmission slot of at least one node based at least partially upon the discrimination information.

According to yet another aspect, information communication method for communicating information over a network includes the steps of initializing a node, detecting a communication conflict, receiving discrimination information, and changing the transmission slot of the node.

In one aspect, the initializing step includes initializing a node by assigning a transmission slot of a plurality of transmission slots, where the node is of a particular node type. The node is generally adapted to communicate using the transmission slot. Each transmission slot is generally formed from a communication cycle that has a time period, a static transmission area, and a dynamic transmission area. The said static transmission area includes the plurality of transmission slots.

In one aspect, the detecting step includes detecting a communication conflict between the node and at least one other node of the same node type, and the receiving step includes receiving discrimination information provided in the dynamic transmission area. The changing step generally includes changing the transmission slot of the node based at least partially upon the discrimination information.

BRIEF DESCRIPTION OF THE DRAWINGS

These and other features, aspects and advantages of the present invention are now described with reference to the drawings of preferred embodiments, which embodiments are intended to illustrate and not to limit the present inventions. The drawings comprise 12 figures in which.

DETAILED DESCRIPTION OF THE PREFERRED EMBODIMENT

Figure 1:
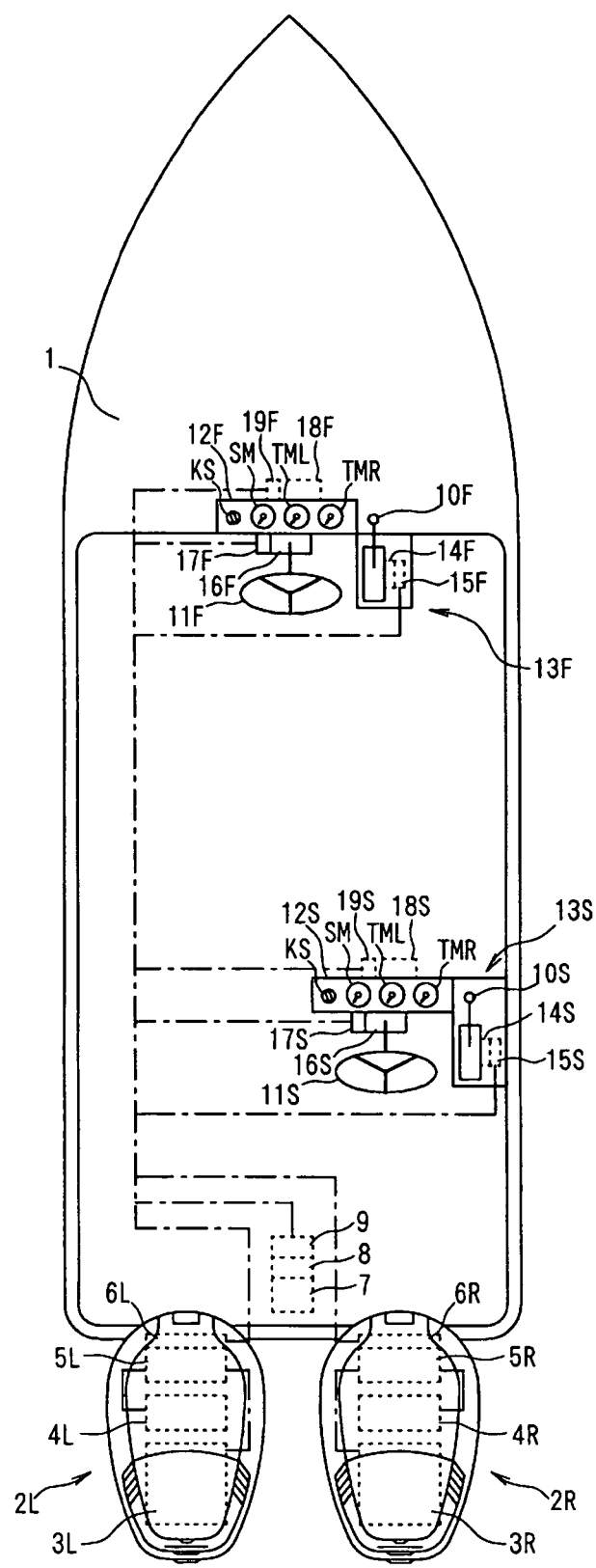
FIG. 1 is a schematic structural view illustrating a first embodiment of the present invention.

FIG. 1 is a schematic structural view illustrating a propulsion control device for a boat according to a first embodiment of the present invention. Although the following embodiment is described with respect to particular operating components of a boat, it should be well understood that the present invention is not to be so limited. For example, any multitude of structures, devices, and vehicles may be utilized, as is well known to those of skill in the art.

In the drawing, designated as 1 is a hull. In one embodiment, a plurality of outboard motors, for example, two outboard motors 2L and 2R, are attached to the stern of the hull 1, although any number of outboard motors may be used. The outboard motors 2L and 2R have electronic control units 5L and 5R, respectively, for electronically controlling engines 3L and 3R provided in the outboard motors 2L and 2R and for controlling the forward-reverse switching of shift mechanisms 4L and 4R provided in the outboard motors 2L and 2R. The electronic control units 5L and 5R are connected to control unit nodes 6L and 6R, respectively.

In one embodiment, a boat speed sensor 7 such as a paddle sensor is provided at the bottom of the stern of the hull 1. The detection value detected by the boat speed sensor 7 is fed to a control unit 8, and the control unit 8 calculates boat speed data based on the detection value from the boat speed sensor 7 and outputs the calculated boat speed data to a boat speed node 9.

In one embodiment, a first cockpit 13F includes a remote control lever 10F to provide instruction on the throttle opening and shift change to the outboard motors 2L, 2R, and a control panel unit 12F, which is located at a front part of the hull 1. The control panel unit 12F, is generally located on the front left side of the remote control lever 10F, and in one embodiment, includes a steering wheel 11F, a key switch KS, an azimuth meter SM, and tachometers TML, TMR for the outboard motors 2L and 2R, respectively. The control panel unit 12F is generally located at a front part on the hull 1. In one embodiment, a second cockpit 13S includes a remote control lever 10S to provide instruction on the throttle opening and shift change to the outboard motors 2L, 2R, and a control panel unit 12S, which in one embodiment includes a steering wheel 11S, a key switch KS, and tachometers TML, TMR for the outboard motors 2L and 2R, respectively. The control panel unit 12S is generally located at the front left side of the remote control lever 10S.

In one embodiment, the remote control levers 10F and 10S in the cockpits 13F and 13S have control units 14F and 14S, respectively, for calculating and transmitting throttle opening command data and shift command data. The control units 14F and 14S are connected to remote control nodes 15F and 15S, respectively. The steering wheels 11F and 11S have control units 16F and 16S, respectively, for calculating and transmitting steering angle command values corresponding to the rotational angles of the steering wheels 11F and 10S. The control units 16F and 16S are connected to steering nodes 17F and 17S, respectively. The control panel units 12F and 12S have control units 18F and 18S, respectively, for transmitting a key switch signal and for receiving and displaying azimuth data, engine rotational speeds, boat speed data, and so on. The control units 18F and 18S are connected to control panel node 19F and 19S, respectively. A neutral position N, a trawl (forward) position F, a back trawl (reverse) position R, a trawl accelerating region GF, or a back trawl accelerating region GR can be selected with the remote control levers 10F and 10S. The rotational positions of the remote control levers 10F and 10S are detected by rotational position sensors, each including, for example, a rotary potentiometer, or an optical encoder. In one embodiment, the control units 14F and 14S calculate and output throttle opening command values and shift command values based on the detected rotational positions.

Figure 2:
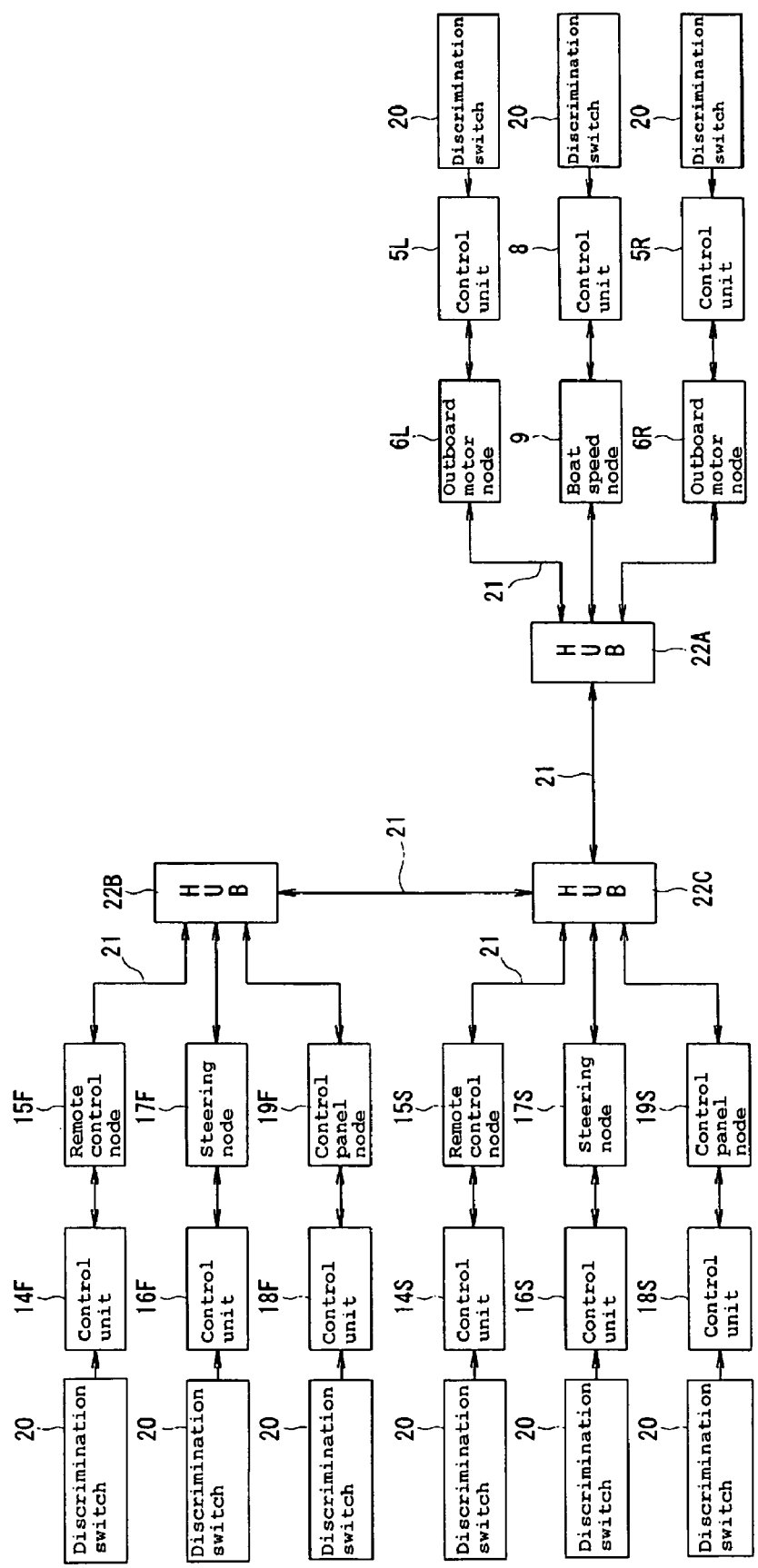
FIG. 2 is a block diagram illustrating one embodiment of the structure of a network.

Each of the control units 5L, 5R, 8, 14F, 14S, 16F, 16S, 18F and 18S is connected to a discrimination switch 20 for selecting a specific control unit, as shown in FIG. 2.

With reference to FIG. 2, in one embodiment, control unit nodes 6L and 6R and the boat speed node 9 are connected to a hub 22A by buses 21, which include twisted cables or the like. The remote control node 15F, the steering node 17F and the control panel node 19F in the first cockpit are connected to a hub 22B by communication cables 21. The remote control node 15S, the steering node 17S and the control panel node 19S in the second cockpit are connected to a hub 22C by communication cables 21 as well. The hubs 22A-C are connected in series by communication cables 21 to form a cascade star-connection network.

It will be well understood by those of skill in the art that any of a variety of network topologies or architectures may be utilized in accordance with additional embodiments of the present invention. For example, the components of the network, which in one embodiment includes hubs 22A-C, may be connected in a mesh, star, bus, ring, or tree topology. In another embodiment, the network includes a combination of two or more topologies, such as groups of star-configured networks connected to a linear bus backbone.

In one embodiment, time is synchronized in the nodes 6L, 6R, 9, 15F, 17F, 19F, 15S, 17S and 19F by a time-synchronization algorithm. A transmission schedule, which will be described later, is set for each type of node. Each of the nodes performs a bus access of a time trigger type and a CSMA (Carrier Sense Multiple Access) type according to the transmission schedule. Also, each of the nodes performs transmission timing changing processing for shifting from the current transmission area of the transmission schedule to an adjacent transmission area when receiving discrimination information transmitted from another node of the same type.

Figure 3:
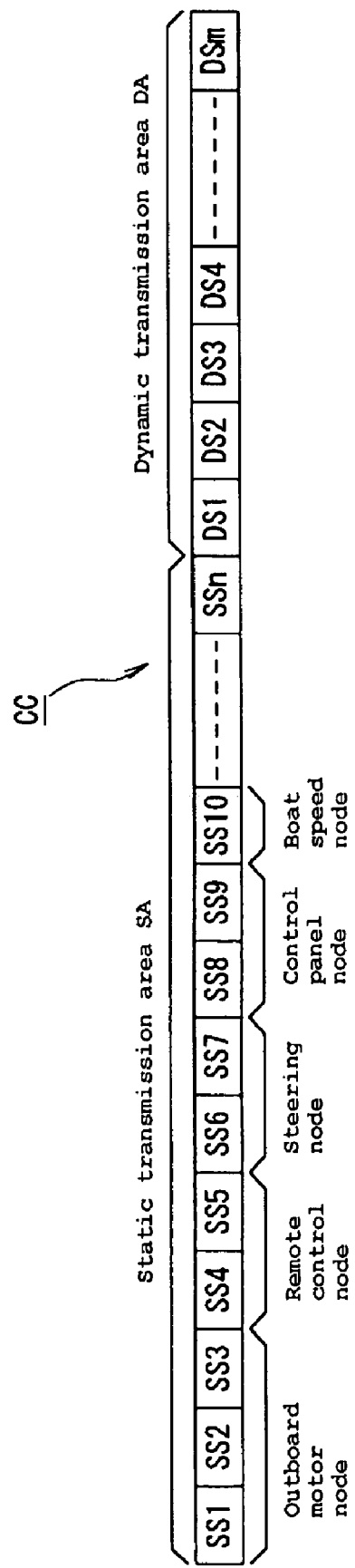
FIG. 3 is one embodiment of a transmission schedule.

With reference to FIG. 3, in one embodiment of the transmission schedules, one communication cycle CC includes a static transmission area SA, which includes transmission slots SS1 to SSn. The number of transmission slots is based on the number n (n is a positive integer) of nodes connectable to the network and on the number of nodes of the same types. Each node can make a transmission at its respective transmission slot. The communication cycle CC also includes a dynamic transmission area DA having m number of transmission slots DS1 to DSm, each having a prescribed length during which each node can arbitrarily make transmission. In one embodiment, each transmission slot DS1-DSm also has an event trigger function.

For example, in one embodiment, the first to third transmission slots SS1 to SS3 in the static transmission area SA are allocated as transmission areas for the control unit nodes. The first transmission slot SS1 is set as a right outboard motor node, the second transmission slot SS2 is set as a left outboard motor node, and the third transmission slot SS3 is set as a center outboard motor node. The fourth and fifth transmission slots SS4 and SS5 are allocated as transmission areas for the remote control nodes. The sixth and seventh transmission slots SS6 and SS7 are allocated as transmission areas for the steering nodes. The eighth and ninth transmission slots SS8 and SS9 are allocated as transmission areas for control panel nodes. The first and second transmission slots of each of the above transmission slot groups are allocated for the first cockpit and for the second cockpit, respectively. The tenth transmission slot SS10 is allocated as a transmission area for a boat speed node. The other transmission slots SS11 to SSn are allocated in accordance with the number of connectable nodes of the same type, for example, as transmission areas for a fish detector node, an audio equipment node and so on. Other transmission slot allocations may be employed, as is well understood by those of skill in the art.

In one embodiment, for each of the nodes 6L, 6R, 9, 15F, 17F, 19F, 15S, 17S and 19S, the first transmission slot of the corresponding slot group in the transmission schedule is set as a default value. When power is supplied and the nodes are activated, each of the nodes starts transmission of data when it is the default time for the transmission slot and maintains a reception state when it is the time for other transmission slots.

Figure 4:
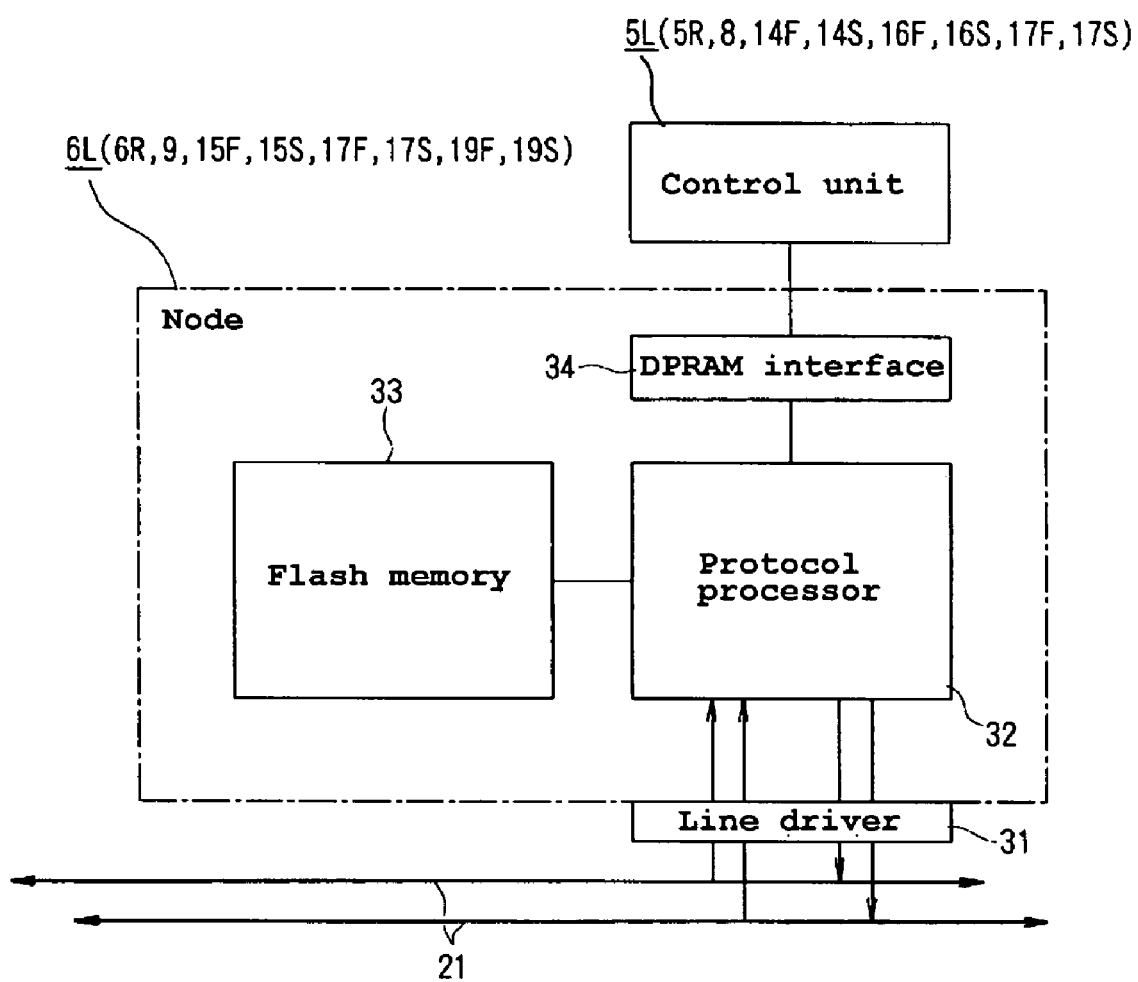
FIG. 4 is a block diagram illustrating one embodiment of a node.

In one embodiment, each of the nodes 6L, 6R, 9, 15F, 17F, 19F, 15S, 17S and 19S has a protocol processor 32 connected to a duplex bus 21 via a line driver 31 as shown in FIG. 4. A flash memory 33 stores the transmission schedule, and connects to the protocol processor 32. The protocol processor 32 is connected to an external control unit 5L, 5R, 8, 14F, 16F, 18F, 14S, 16S or 18S via a dual port RAM interface 34.

Figure 5:
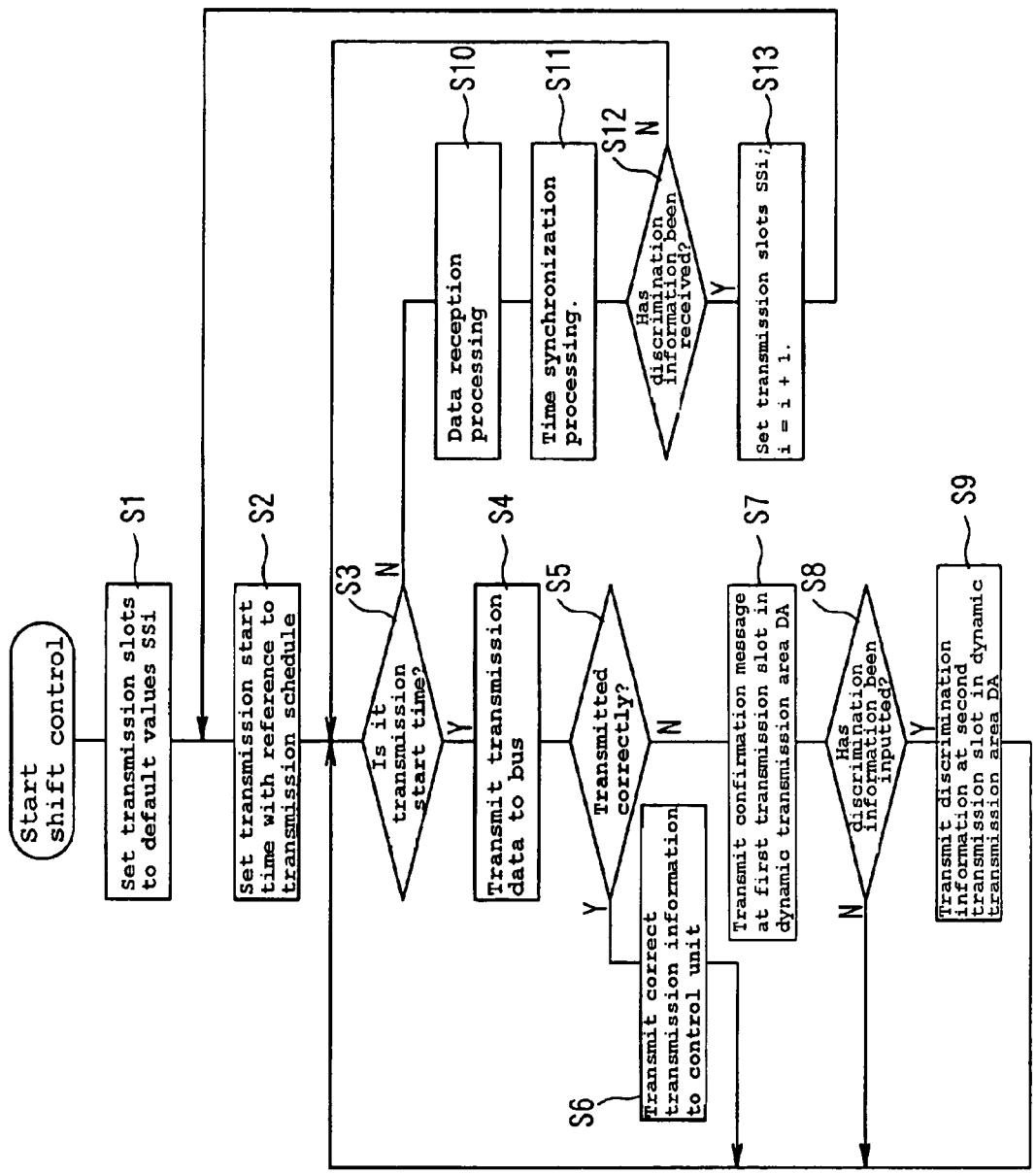
FIG. 5 is flowchart showing an example of one embodiment of a method for communication control processing, which typically is performed by a node.

In one embodiment, each protocol processor 32 performs the communication control processing 100 shown in FIG. 5. The communication control processing 100 is started when power is supplied to the nodes 6L, 6R, 9, 15F, 17F, 19F, 15S, 17S and 19S. In step S1, the transmission slots are set to default values SSi (i=1, 2, 3, . . . , n). Then, in step S2, transmission start time Ts is set with reference to the transmission schedule stored in the flash memory 33.

Then, in step S3, it is determined whether it is the transmission start time Ts. If it is the transmission start time Ts, transmission interruption is applied to the external control unit 5L, 5R, 8, 14F, 16F, 18F, 14S, 16S or 18S to request transmission of transmission data. Transmission data are inputted from the control unit 5L, 5R, 8, 14F, 16F, 18F, 14S, 16S or 18S through the dual port RAM interface 34, and the transmission data are transmitted to the bus 21 through the line driver 31 in step S4.

Then, in step S5, it is determined whether the transmission data have been transmitted correctly. If the transmission data have been transmitted correctly, correct transmission information is transmitted to the external control unit 5L, 5R, 8, 14F, 16F, 18F, 14S, 16S or 18S in step S6. Then, the process 100 goes back to step S3. When the transmission data conflict with transmission data from another node, a transmission error occurs, and a confirmation message is transmitted using the first transmission slot in the dynamic transmission area DA in step S7. Then, in step S8, it is determined whether discrimination information has been inputted from the external control unit 5L, 5R, 8, 14F, 16F, 18F, 14S, 16S or 18S. If no discrimination information has been inputted, the process 100 goes back to step S3. If discrimination information is inputted, discrimination information is transmitted using the second transmission slot in the dynamic transmission area DA in step 9. Then, the process 100 goes back to step S3. Preferably, different transmission slots in the dynamic transmission area are set for different types of nodes for transmitting discrimination information.

If it is not the transmission start time Ts in step S3, data reception processing for receiving data from bus 21 is performed in step S110. Then, in step S11, time synchronization processing occurs. During step S11, the method 100 calculates the deviations or differences between the actual times of receipt of the received data in the static transmission area SA of one communication cycle and the scheduled receipt times at the transmission slots, which are based on the transmission schedule stored in the flash memory 33. In addition, time synchronization correcting also occurs, in which the current synchronization time is adjusted based upon the average of the calculation result values and the maximum and minimum values. Then, the process 100 goes to step S12.

In step S12, it is determined whether discrimination information has been received from nodes of the same type. If not, the process 100 goes back to step S3. If discrimination information has been received from nodes of the same type, transmission slot index i is increased by one for each transmission slot SSi in step S13. Then, the process 100 goes back to step S2.

In one embodiment, in each of the external control units 5L, 5R, 8, 14F, 16F, 18F, 14S, 16S and 18S, engine control processing, boat speed transmission processing, throttle opening command value/shift command value transmission processing are separately performed as a main program. Each external control unit 5L, 5R, 8, 14F, 16F, 18F, 14S, 16S, 18S performs initial setting processing 200 shown in FIG. 6 after the start of power supply.

In the initial setting processing 200, it is determined whether the correct transmission information is inputted from the protocol processor 21 of the node in step S21. If correct transmission information is inputted, the initial setting processing is terminated. If correct transmission information is not inputted, it is determined whether the discrimination switch 20 connected to the external control units 5L, 5R, 8, 14F, 16F, 18F, 14S, 16S or 18S is on in step S22. If the discrimination switch 20 is off, the process goes back to step S21. If the discrimination switch 20 is on, predetermined discrimination information, which is different for each type of device, is transmitted to the node in step S23. Then, the initial setting processing 200 is terminated.

Figure 6:
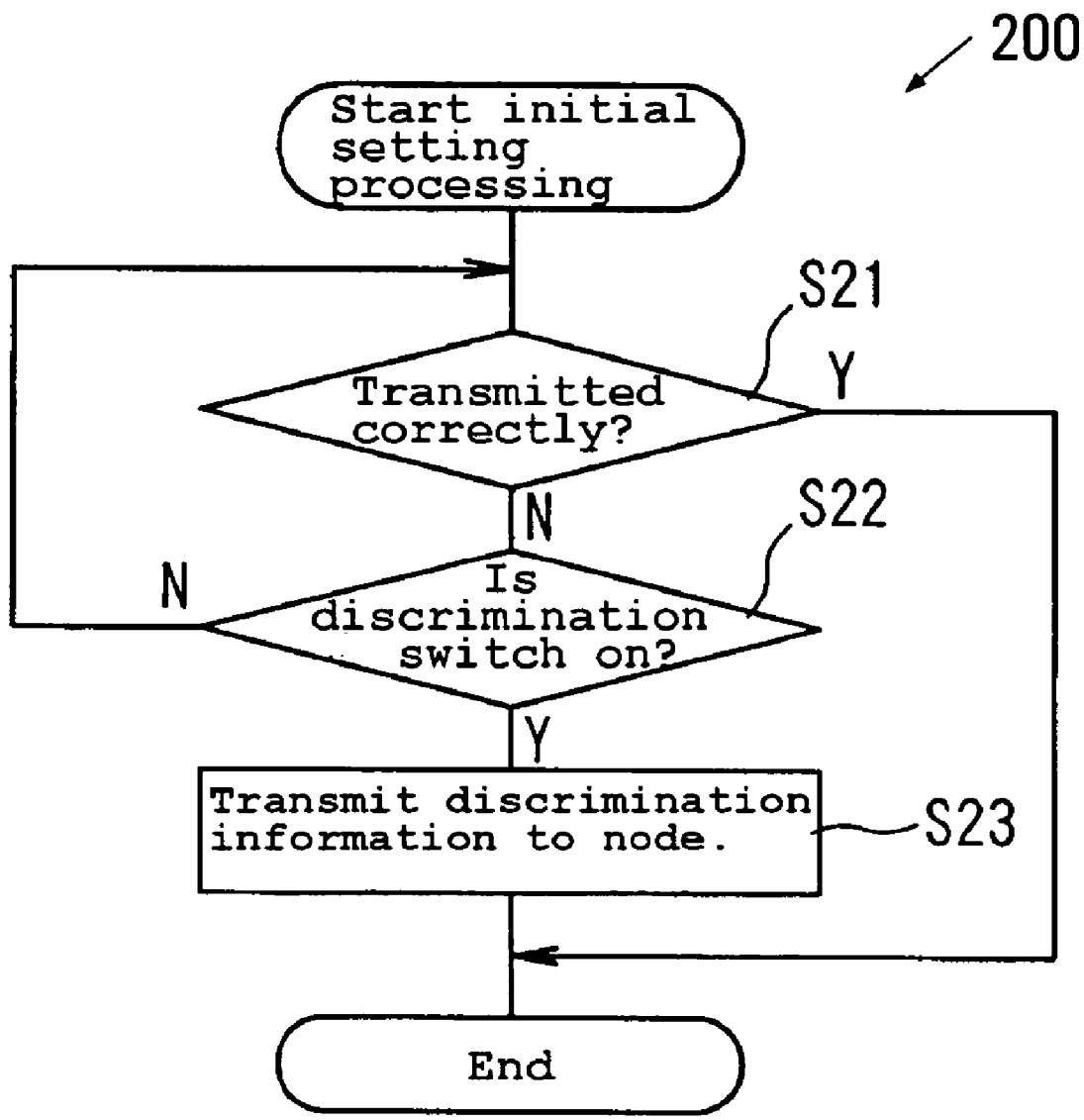
FIG. 6 is a flowchart showing an example of one embodiment of the method of initial setting processing, which is typically performed by a control unit.

In the processing shown in FIG. 5 and FIG. 6, step S5 in FIG. 5 generally corresponds to one embodiment of detecting a conflict and steps S1-S4, S6-S9, S12, and S13 generally correspond to one embodiment of setting a transmission area. Steps S8 and S9 generally correspond to one embodiment of transmitting discrimination information.

The operation of the first embodiment will be described.

A boat is initially stopped at a pier with the key switch KS off and the power supply to the nodes 6L, 6R, 9, 15F, 17F, 19F, 15S, 17S and 19S and the control units 5L, 5R, 8, 14F, 16F, 18F, 14S 16S and 18S are off. The remote control levers 10F and 10S in the first and second cockpits 13F and 13S are in the neutral positions N. When an operator comes on board and switches on the key switch KS, power is supplied to the nodes 6L, 6R, 9, 15F, 17F, 19F, 15S, 17S and 19S and to the control units 5L, 5R, 8, 14F, 16F, 18F, 14S, 16S and 18S. At this point, transmission and reception of data can be performed (e.g., communication may occur) between the nodes 6L, 6R, 9, 15F, 17F, 19F, 15S, 17S and 19S.

Transmission slots, which in one embodiment are capable of transmitting data, are set to default values in the nodes 6L, 6R, 9, 15F, 17F, 19F, 15S, 17S and 19S. The same transmission slot is set in the nodes of the same type. That is, the transmission slot SS1 is set in the outboard motor nodes 6L and 6R, the transmission slot SS10 is set in the boat speed node 9, the transmission slot SS4 is allocated for the remote control nodes 15F and 15S, the transmission slot SS6 is allocated for the steering nodes 17F and 17S, and transmission slot SS8 is allocated for the control panel nodes 19F and 19S.

Thus, since the default values are the same in the nodes 6L and 6R, in the nodes 15F and 15S, in the nodes 17F and 17S, and in the nodes 19F and 19S (which are of the same type), data transmission is performed at the transmission slots SS1, SS4, SS6 and SS8 simultaneously. As a result, transmission data conflict with each other, and a transmission error occurs.

Figure 7:
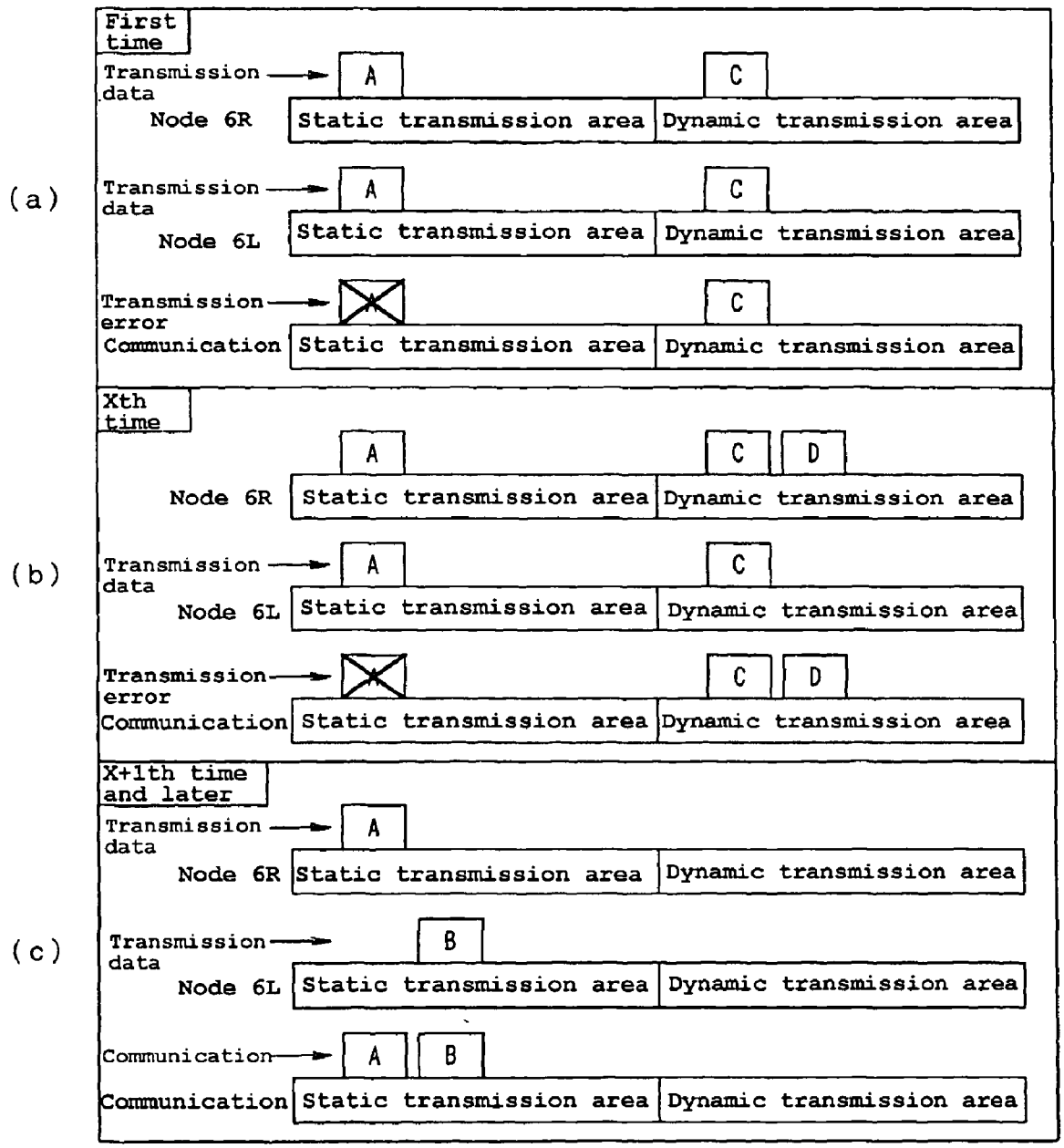
FIG. 7 is a diagram of the operations of the first embodiment.

One example of this conflict will be described in detail regarding the outboard motor nodes 6L and 6R with reference to FIG. 5 and FIG. 7. In the first communication cycle after the start of transmission, the nodes 6L and 6R send transmission data "A" at the same transmission slot SS1 as shown in FIG. 7 at first time (a), and a communication error is detected on the bus 21. Then, the process goes from step S5 to step S7, and the node 6L and 6R each send a confirmation message to the first transmission slot DS1 of the dynamic transmission area DA.

In this state, however, since the nodes 6L and 6R do not change the transmission slot, data transmission is repeated using transmission slot SS1. Then, when the operator switches on the discrimination switch 20, which, in one embodiment, is connected to the control unit 5R for the right outboard motor 2R, the process goes from step S22 to step S23, and the control unit 5R transmits discrimination information set in the engine control unit to the node 6R. In one embodiment, the operator switches on the discrimination switch according to instructions in an operation manual. The discrimination switch is turned on at the Xth time of transmission.

Thus, since the state in which transmission is not correctly carried out continues in node 6R, the process 100 goes from the step S5 to the step S7 in the processing 100 shown in FIG. 5, and a confirmation message "C" is transmitted using the first transmission slot DS1 in the dynamic transmission area DA, as shown in FIG. 7 at Xth time (b). Then, the process 100 goes to step S9 from step S8, and discrimination information "D" is transmitted using the second transmission slot DS2 in the dynamic transmission area DA, as shown in FIG. 7 at Xth time (b).

At this time, the node 6L is shifted to a reception state after the transmission of the confirmation message "C" as shown in FIG. 7 at Xth time (b), and node 6L receives the confirmation information that has been outputted from node 6R to the bus 21. Then, the process 100 goes from step S12 to step S13 in the processing shown in FIG. 5, and the transmission slot SS2, which has an index that is one greater the index of the current transmission slot (SS1), is set. Then, the process 100 goes back to step S2. Then, transmission start time Ts of the new transmission slot SS2 is set with reference to the transmission schedule.

Thus, in the next X+1th communication cycle, since the node 6R transmits data at the transmission slot SS1 and the node 6L transmits data at the transmission slot SS2 as shown in FIG. 7 at X+1th time and later (c), transmissions can be carried out according to the transmission schedule without causing a conflict between the transmission data from the nodes 6R and 6L. Since transmissions are correctly completed in the nodes 6R and 6L, the process 100 goes from step S5 to step S6 in FIG. 5, and correct transmission information is transmitted to the control units 5L and 5R. When the control units 5L and 5R receive the correct transmission information in step S21 of FIG. 6, it is determined that the conflict state is resolved and the prescribed setting processing 200 is terminated.

In one embodiment, an operation manual instructs an operator to switch on the discrimination switch 20 for the right outboard motor 2R to resolve communication conflict between transmission slots for the right and left outboard motors 2L and 2R. Also, since the transmission schedule determines that the transmission data at the first transmission slot are the transmission data from the right engine control unit 5R and the transmission data at the second transmission slot SS2 are the transmission data from the left engine control unit 5L, transmission data (e.g., engine rotational speeds) from the control units 5L and 5R can be thereafter received by the control panel nodes 19F and 19S and displayed on right and left tachometers.

Similarly, as for control nodes 15F and 15S for the remote control levers, nodes 17F and 17S for the steering wheels, and nodes 19F and 19S for the control panels in the first and second cockpit 13F and 13S, when the associated discrimination switches 20 (e.g., for the control unit 14F of the remote control lever, the control unit 16F of the steering wheel, and the control unit 18F of the control panel in the first cockpit 13F) are switched on, the transmission slots for the nodes 15S, 17S and 19S in the second cockpit 13S are changed to the transmission nodes SS5, SS7 and SS9 and conflict-free transmission may be made. Thus, a conflict with the transmission data from the nodes 15F, 17F and 19F in the first cockpit 13F can be avoided and data transmission can be carried out using proper transmission slots set in the transmission schedule.

When there are not two or more nodes of the same type connected to the network, a conflict with transmission data from other nodes does not occur even when the node performs transmission at the transmission slot SSi of the default value. Thus, the transmission at the transmission slot of the default value is continued. Since no transmission data are transmitted using other transmission slots of the same type, the number of devices of the same type connected to the network can be easily known by monitoring the transmission data at the transmission slot, and optimum control in accordance with the number of devices connected to the network can be achieved.

According to the first embodiment, allocation of transmission areas consistent with a transmission schedule can be made without complicated setting operations by switching on the discrimination switch 20 of a control unit connected to a node of the same type according to the procedure set in the operation manual.

Although the above description of the first embodiment has been made on the assumption that there are two nodes of the same type for simplicity of the explanation, the present invention is not limited thereto. For example, in one embodiment, when the boat has three outboard motors, the discrimination switch connected to the control unit for the right outboard motor is first switched on to change the transmission slot of the outboard motor nodes for the left and center outboard motors to the second transmission slot SS2, and then the discrimination switch connected to the control unit for the left outboard motor is switched on to change the transmission slot of the outboard motor node for the center outboard motor to the third transmission slot SS3. Any number of nodes and node types may be employed in additional embodiments.

Although the discrimination switch 20 is operated according to an operation manual in the first embodiment, the present invention is not limited thereto. The discrimination switch for the right outboard motor may be set to on at any time, for example, at the time of purchase of the outboard motor, or automatically.

Although the right outboard motor and the first cockpit are set as default values in the first embodiment, the present invention is not limited thereto. The left outboard motor and the second cockpit may be set as default values.

Figure 8:
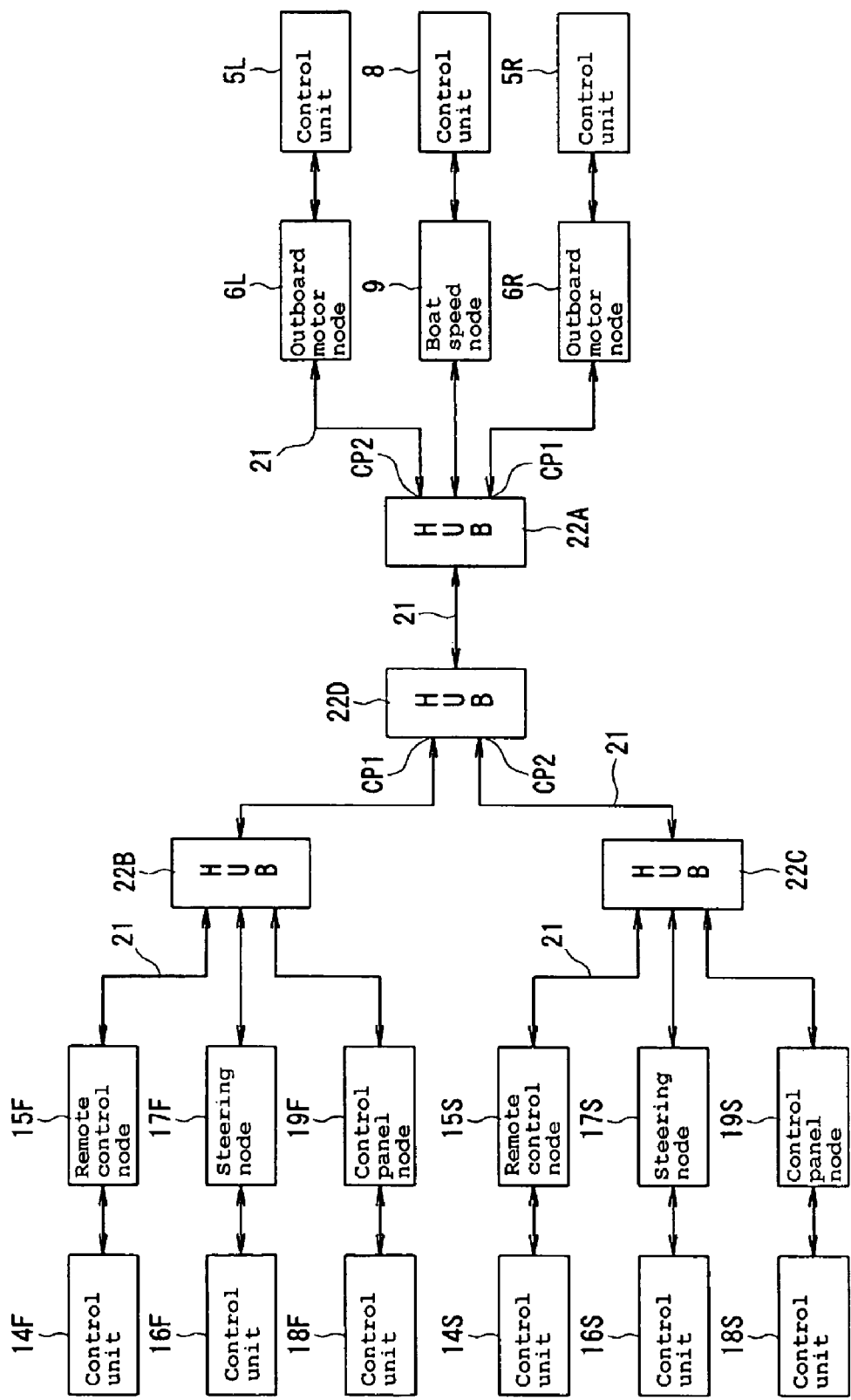
FIG. 8 is a block diagram illustrating the structure of a network in a second embodiment of the present invention.

Description will be made of a second embodiment of the present invention with reference to FIG. 8.

In the second embodiment, nodes of the same type can be in compliance with a transmission schedule even when the operator does not operate the discrimination switch.

In the second embodiment, hubs 22B and 22C are connected to a hub 22D by communication cables or bus 21, and hub 22D and hub 22A are connected to each other by a communication cable 21 as well. Also, hub 22A and hub 22D have an intelligent function so that they can perform processing for transmitting discrimination information. In the present embodiment, discrimination switches 20 are not connected to the control units 5L, 5R, 8, 14F, 16F, 18F, 14S, 16S and 18S.

In one embodiment, right and left connection ports CP1 and CP2 of the three connection ports of the hub 22A are set for the right outboard motor 2R and the left outboard motor 2L, respectively. These settings may be indicated by marking the surface of the case of the hub 22A that the right and left connection ports CP1 and CP2 are for connecting the control unit 5R of the right outboard motor 2R and the control unit 5L of the left outboard motor 2L, respectively. The hub 22D has a left port CP 1 for the first cockpit. The left port CP 1 of the hub 22D is connected to hub 22B to which the remote control node 15F, the steering node 17F and the control panel node 19F in the first cockpit are connected. Hub 22D also has a right port CP2 for the second cockpit. The right port CP2 of the hub 22D is connected to hub 22C to which the remote control node 15S, the steering node 17S and the control panel node 19S in the second cockpit are connected.

Figure 9:
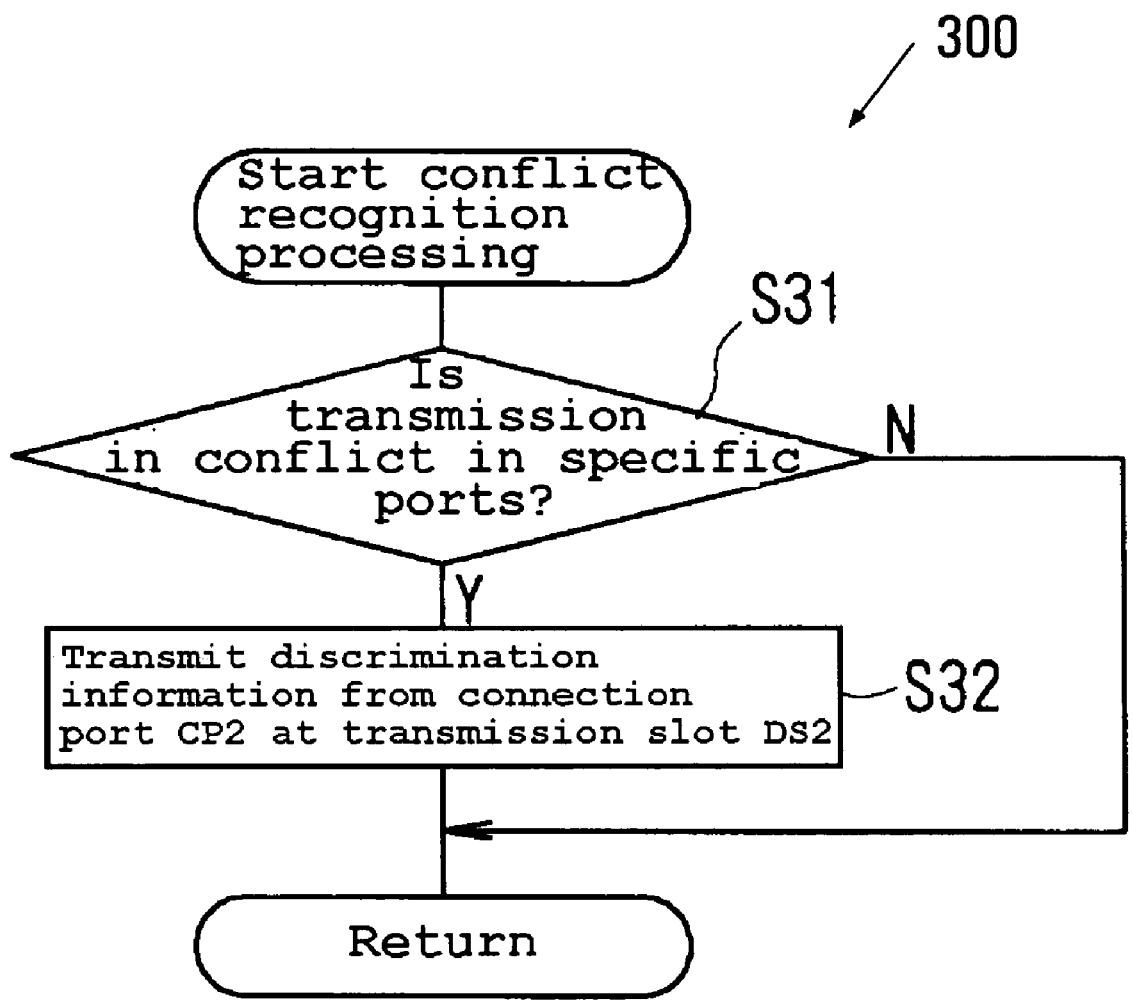
FIG. 9 is a flowchart showing an example of the procedure of conflict recognition processing by a hub in the second embodiment.

The hubs 22A and 22D detect a conflict of transmission data. When the hubs 22A and 22D detect a conflict of transmission data, they perform conflict recognition processing 300 for transmitting discrimination information to one of the ports. In the conflict recognition processing 300, it is determined whether transmission data are in conflict at the connection ports CP1 and CP2 in step S31 as shown in FIG. 9. When transmission data are not in conflict, the conflict recognition processing 300 is terminated. When transmission data are in conflict, discrimination information is transmitted from only a connection port CP2 at the second transmission slot DS2 in the dynamic transmission area of the communication cycle in step S32. Then, the conflict recognition processing 300 is terminated.

In the processing 300 shown in FIG. 9, step S31 corresponds to one embodiment of detecting a conflict, and step S32 corresponds to one embodiment of transmitting discrimination information.

Figure 10:
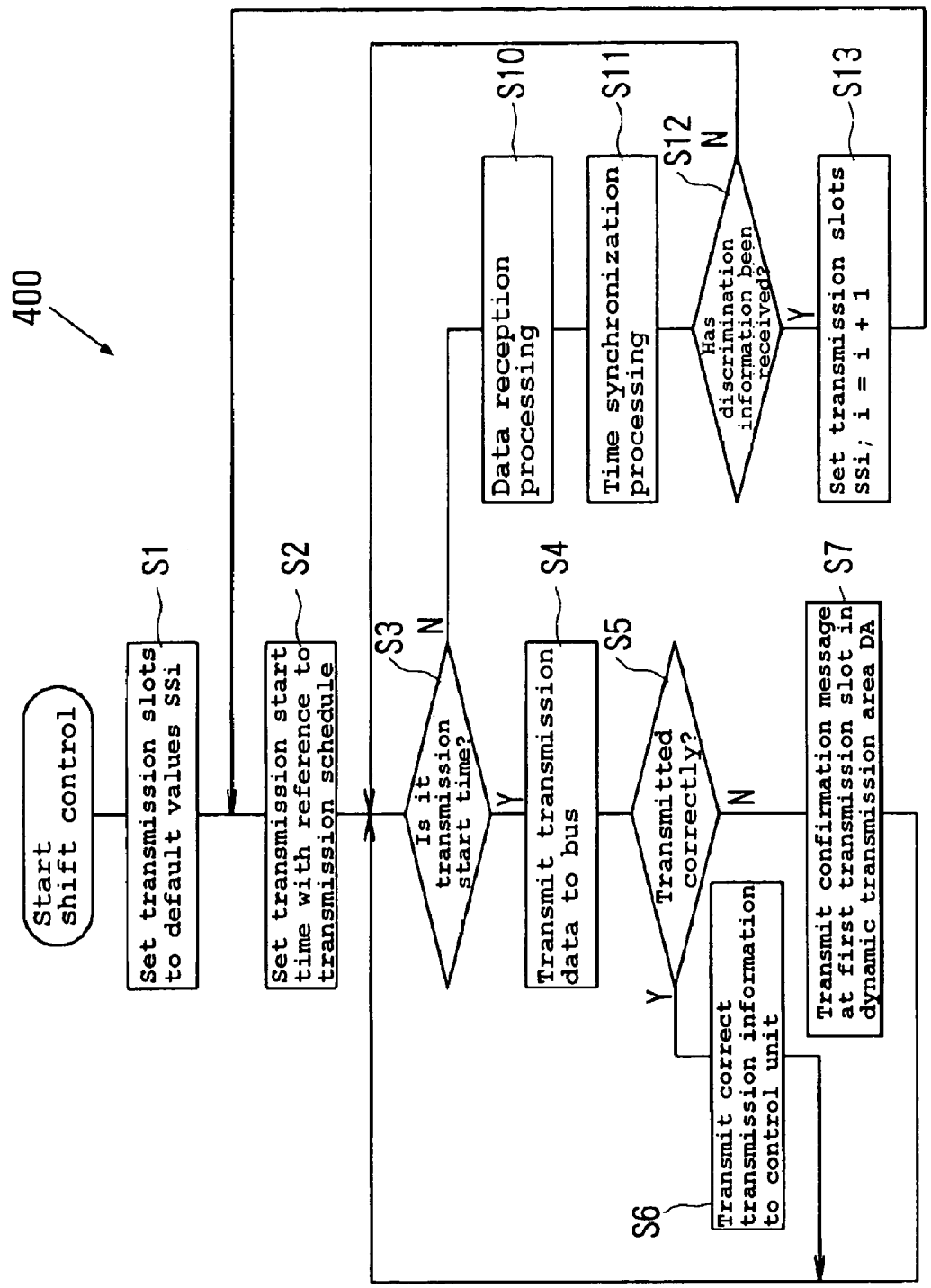
FIG. 10 is a flowchart showing an example of the procedure of communication control processing, which is typically performed by a node in the second embodiment.

One embodiment of communication control processing 400, as shown in FIG. 10, is performed in the nodes 6L, 6R, 9, 15F, 15S, 17F, 17S, 19F and 19S. In the communication control processing 400, the steps S8 and S9 in the processing in the first embodiment shown in FIG. 5 are omitted as shown in FIG. 10. The process 400 goes back to step S3 after a confirmation message has been transmitted to the first transmission slot in the dynamic transmission area in step S7. Thus, the steps corresponding to the steps in FIG. 5 are designated by the same numerals and their detailed description will be omitted.

In the processing shown in FIG. 10, the processes in steps S1-S7, S12, and S13 correspond to one embodiment of setting a transmission area. Also, the initial setting processing in the control units 5L, 5R, 8, 14F, 14S, 16F, 16S, 18F and 18S is omitted in the present embodiment.

According to the second embodiment, when the key switch KS is switched on, power is supplied from the supply power to the control units 5L, 5R, 8, 14F, 14S, 16F, 16S, 18F and 18S, and the nodes 6L, 6R, 9, 15F, 15S, 17F, 17S, 19F and 19S and the network are activated. Transmission data are transmitted from nodes of the same type simultaneously at the transmission start time of the transmission slot, which is set by a default value, and transmission error occurs, as in the case with the first embodiment described above. However, since the nodes from which data are transmitted simultaneously are connected to the same hub 22A or 22D, the hubs 22A and 22D can detect a conflict of transmission data at their connection ports. When a conflict of transmission data is detected, a discrimination signal is outputted to the appropriate connection port at the second transmission slot in the dynamic transmission area DA of the communication cycle. Thus, only the control unit connected to the connection port receives the discrimination information.

Figure 11:
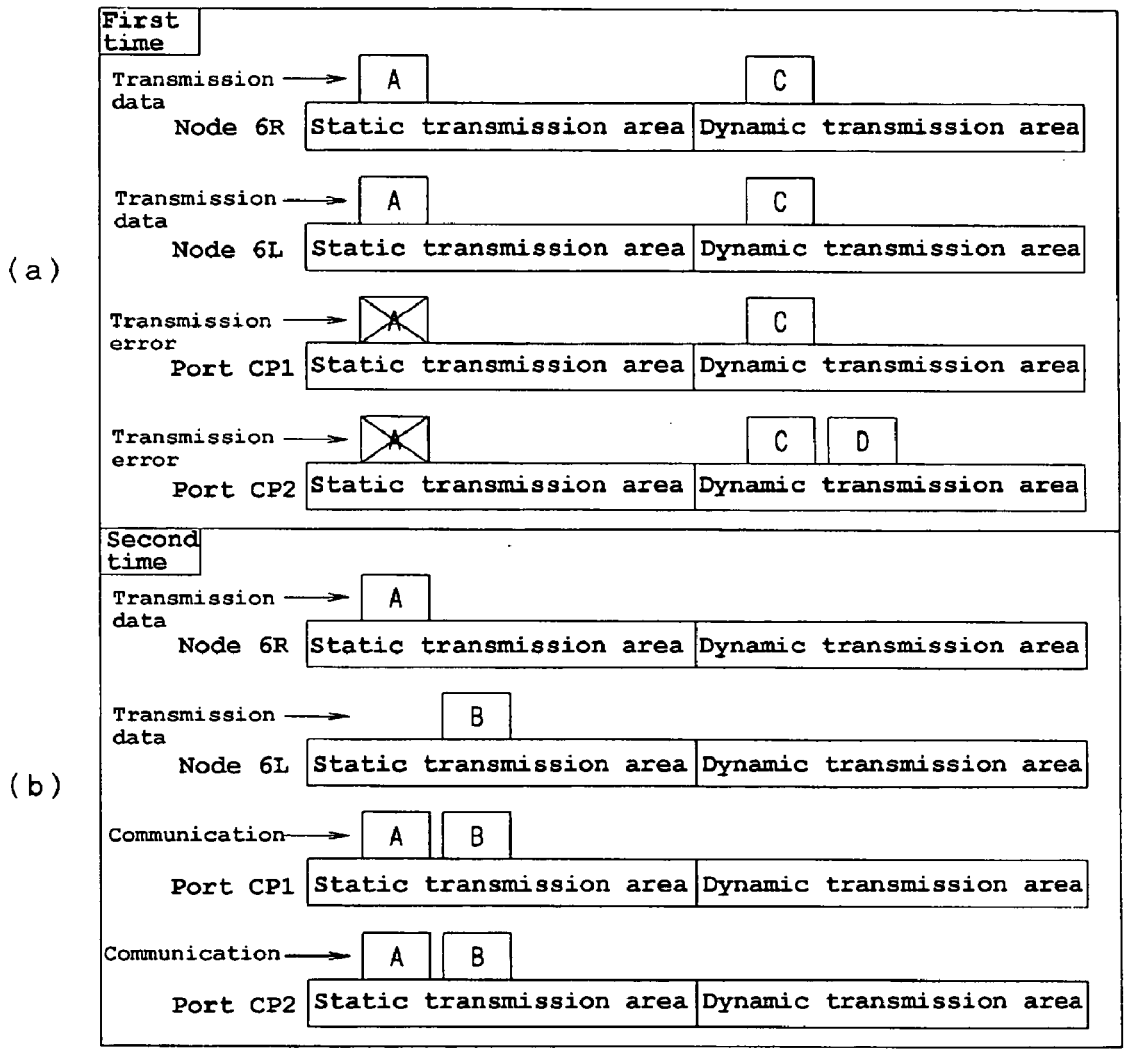
FIG. 11 is a view used to explain the operations of the second embodiment.

For example, in hub 22A, transmission data are simultaneously transmitted from the outboard motor node 6L for the left outboard motor 2L and the outboard motor node 6R for the right outboard motor 2R at the first transmission slot SS1 of the communication cycle as shown in FIG. 11 at first time (a). Thus, in the processing 300 shown in FIG. 9, the process 300 goes from step S31 to step S32, and discrimination information is transmitted from the connection port CP2 at the second transmission slot DS2 in the dynamic transmission area DA of the communication cycle. Thus, the discrimination information is received only by the outboard motor node 6L for the left outboard motor 2L. Then, in the outboard motor node 6L, the process 400 goes from step S12 to step S13 in the processing shown in FIG. 10, and the transmission slot SS2 having an index which is 1 greater than that of the current transmission slot is set as a new transmission slot. Then, in the next communication cycle, transmission data are transmitted from the outboard motor node 6R for the right outboard motor 2R at the first transmission slot SS1, and transmission data are transmitted from the outboard motor node 6L for the left outboard motor 2L at the second transmission slot SS2, as in the case with the first embodiment described above. Data transmission state compliance with the transmission schedule can thereby be achieved.

Figure 12:
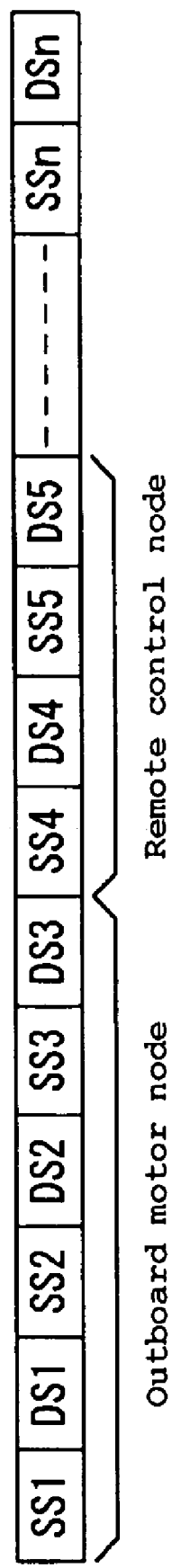
FIG. 12 illustrates another example of a communication cycle.

Although in one embodiment the dynamic transmission area DA is set after the static transmission area SA in a communication cycle in the first and second embodiments, the present invention is not limited thereto. In another embodiment, one communication cycle is divided into the same number of transmission areas as the number of connectable nodes, and each of the transmission areas are divided into static transmission area SSj (j=1, 2, . . . , n) and dynamic transmission area DSk (k=1, 2, . . . n), as shown in FIG. 12. In this embodiment, when transmission data conflict in a static transmission area, discrimination information can be transmitted at a dynamic transmission area following the static transmission area, and a conflict of transmission of discrimination information with nodes of different types in the dynamic transmission area can be prevented.

Although both the throttle opening control and the shift control are performed in the engine control units 5L and 5R in the first and second embodiments, the present invention is not limited thereto. The engine control units 5L and 5R may perform only the throttle opening control and the shift control may be performed in other control units. The shift control may be mechanically performed by a wire connecting the remote control lever 10F and the shift mechanisms 4L and 4R.

The above embodiments have been described with reference to particular operational components of a boat. However, in other embodiments, the communication system can include additional, alternative, or a combination of additional and alternative components that are able to be coupled to the communication network. For example, various sensors (e.g., a wind velocity sensor, a level sensor, etc.), displays, indicators, input devices (e.g., a global positioning system sensor, a fish finder, etc.), output devices, memory or controllers can be coupled either directly or indirectly to a communications network.

Although this invention has been disclosed in the context of certain preferred embodiments, it will be understood by those skilled in the art that the present invention extends beyond the specifically disclosed embodiments to other alternative embodiments and/or uses of the invention and obvious modifications and equivalents thereof. In particular, while the present information communication system, device, and method have been described in the context of particularly preferred embodiments, the skilled artisan will appreciate, in view of the present disclosure, that certain advantages, features and aspects of the information communication system, device, and method may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment described above, but should be determined only by a fair reading of the claims that follow.

What is claimed is:

1. An information communication device for communicating information among a plurality of components, the information communication device comprising:
   a plurality of nodes, each being of a particular node type that correspond to a particular transmission slot of a plurality of transmission slots, each transmission slot formed from a communication cycle having a prescribed time period, said plurality of transmission slots being synchronized with one another;
   said communication cycle further comprising a static transmission area and a dynamic transmission area, said static transmission area including the plurality of transmission slots that correspond to the node types, and the dynamic transmission area being adapted to transmit information indicative of a transmission conflict between at least two nodes; and
   each of the plurality of nodes comprising a conflict detector that determines when the transmission conflict occurs as a result of nodes of the same node type beginning transmission using the same transmission slot, and a transmission area setter for changing at least one of the transmission slots in the static transmission area from a first assigned transmission slot to a second assigned transmission slot based upon information transmitted in the dynamic transmission area.

2. The information communication device of claim 1, wherein the plurality of components comprises a plurality of outboard motors, remote control levers, and key switches of a boat, and the plurality of nodes includes at least one node for controlling one or more engines of one or more of the outboard motors, nodes for the remote control levers, and nodes for key switches.

3. The information communication device of claim 1, wherein the transmission area setter is in communication with a selection operator which can be selectively operated, said transmission area setter comprising a discrimination information transmitter adapted to transmit discrimination information to the dynamic transmission area when both the conflict detector detects said transmission conflict and the selection operator is operated.

4. The information communication device of claim 3, wherein the transmission area setter changes transmission slots in the static transmission area when the conflict detector detects the transmission conflict and when the discrimination information transmitted from a selected node of the dynamic transmission area is received.

5. The information communication device of claim 3, wherein the selection operator comprises a switch.

6. The information communication device of claim 1, wherein said transmission area setter automatically changes the transmission slots in the static transmission area.

7. The information communication device of claim 1, wherein said information is automatically transmitted in the dynamic transmission area based upon said transmission conflict.

8. An information communication device for communicating information among a plurality of components, the information communication device comprising:
   a plurality of nodes, each being of a particular node type that corresponds to a particular transmission slot of a plurality of transmission slots, each transmission slot formed from a communication cycle having a prescribed time period, said plurality of transmission slots being synchronized with one another, said communication cycle further comprising a static transmission area and a dynamic transmission area, said static transmission area having the plurality of transmission slots that correspond to the node types, and the dynamic transmission area being adapted to transmit information indicative of a transmission conflict between at least two nodes; and a hub providing communication between at least two nodes, said hub comprising a conflict detector for detecting the transmission conflict that occurs when nodes of the same node type transmit using the same transmission slot, said hub further comprising a discrimination information transmitter for transmitting discrimination information from a connection port to a connection port node, said discrimination information transmitter adapted to transmit the discrimination information via the dynamic transmission area when the conflict detector detects said transmission conflict, each node comprising a transmission area setter for changing the transmission slot in the static transmission area when receiving the discrimination information.

9. The information communication device of claim 8, wherein the plurality of components comprises a plurality of outboard motors, remote control levers, and key switches of a boat, and the plurality of nodes includes at least one node for controlling one or more engines of one or more of the outboard motors, nodes for the remote control levers, and nodes for key switches.

10. An information communication method for communicating information over a network, the information communication method comprising:

initializing a plurality of nodes by assigning a same initial transmission slot of a plurality of transmission slots to each node, each node being of a same particular node type, each node adapted to communicate using the transmission slot, each transmission slot formed from a communication cycle having a time period, a static transmission area, and a dynamic transmission area, said static transmission area having the plurality of transmission slots;

detecting a transmission conflict between nodes of the same node type, said transmission conflict occurring as a result of nodes of the same node type beginning transmission using the same transmission slot;

providing discrimination information in said dynamic transmission area in response to said detecting; and reassigning the transmission slot of at least one node to a different transmission slot based at least partially upon said discrimination information.

11. The information communication method of claim 10, wherein said providing discrimination information is performed after setting a switch.

12. The information communication method of claim 10, wherein said providing discrimination information is performed automatically.

13. The information communication method of claim 10, further comprising the step of communicating operational information associated with a component of a boat between at least two of the plurality of nodes using the dynamic transmission area.

14. The information communication method of claim 13, further comprising sensing the operation of the component of the boat and generating the information transmitted in the dynamic transmission area.

15. An information communication method for communicating information over a network, the information communication method comprising:

initializing a node by assigning a transmission slot of a plurality of transmission slots, the node being of a particular node type, the node adapted to communicate using the transmission slot, each transmission slot formed from a communication cycle having a time period, a static transmission area, and a dynamic transmission area, said static transmission area having the plurality of transmission slots;

detecting at the node a transmission conflict between the node and at least one other node of the same node type, said transmission conflict occurring as a result of nodes of the same node type beginning transmission using the same transmission slot;

receiving at the node discrimination information provided in said dynamic transmission area in response to said transmission conflict; and changing the transmission slot of the node based at least partially upon said discrimination information.

16. The information communication method of claim 15, further comprising the step of communicating operational information associated with a component of a boat between at least two of the plurality of nodes using the dynamic transmission area.

17. The information communication method of claim 16, further comprising sensing the operation of the component of the boat and generating the information transmitted in the dynamic transmission area.

* * * * *

UNITED STATES PATENT AND TRADEMARK OFFICE
CERTIFICATE OF CORRECTION

PATENT NO. : 7,443,875 B2
APPLICATION NO. : 10/975327
DATED : October 28, 2008
INVENTOR(S) : Okuyama It is certified that error appears in the above-identified patent and that said Letters Patent is hereby corrected as shown below:

In column 4 at line 33, change "10S" to --11S--.

In column 6 at line 40, change "S110." to --S10.--.

In column 9 at line 62, before "for" change "CP 1" to --CP1--.

In column 9 at line 62, before "of" change "CP 1" to --CP1--.

Signed and Sealed this

Seventeenth Day of November, 2009

David J. Kappos
*Director of the United States Patent and Trademark Office*